US008598276B2

(12) United States Patent
Demirors et al.

(10) Patent No.: US 8,598,276 B2
(45) Date of Patent: Dec. 3, 2013

(54) POLYMERS COMPRISING UNITS DERIVED FROM ETHYLENE AND POLY(ALKOXIDE)

(75) Inventors: Mehmet Demirors, Pearland, TX (US); Teresa P. Karjala, Lake Jackson, TX (US); John O. Osby, Lake Jackson, TX (US); Otto J. Berbee, Hulst (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/394,494

(22) PCT Filed: Sep. 14, 2010

(86) PCT No.: PCT/US2010/048821
§ 371 (c)(1),
(2), (4) Date: May 18, 2012

(87) PCT Pub. No.: WO2011/032174
PCT Pub. Date: Mar. 17, 2011

(65) Prior Publication Data
US 2012/0232244 A1    Sep. 13, 2012

Related U.S. Application Data

(60) Provisional application No. 61/242,133, filed on Sep. 14, 2009.

(51) Int. Cl.
C08L 71/02    (2006.01)

(52) U.S. Cl.
USPC ........... 525/187; 525/186; 525/403; 525/404; 528/393; 528/405; 528/417; 528/421

(58) Field of Classification Search
USPC .......... 525/186, 187, 404, 403; 528/393, 405, 528/417, 421
See application file for complete search history.

(56) References Cited

U.S. PATENT DOCUMENTS

| | | | |
|---|---|---|---|
| 3,485,706 A | 12/1969 | May | |
| 3,546,321 A * | 12/1970 | Jabloner et al. | 525/400 |
| 3,627,839 A * | 12/1971 | Vandenberg | 525/404 |
| 3,663,649 A | 5/1972 | Wheeler | |
| 3,726,842 A | 4/1973 | Gropper et al. | |
| 4,178,951 A | 12/1979 | Sweeney | |
| 4,322,027 A | 3/1982 | Reba | |
| 4,340,563 A | 7/1982 | Appel et al. | |
| 4,413,110 A | 11/1983 | Kavesh et al. | |
| 4,544,762 A | 10/1985 | Kaminsky et al. | |
| 4,599,392 A | 7/1986 | McKinney et al. | |
| 4,663,220 A | 5/1987 | Wisneski et al. | |
| 4,668,566 A | 5/1987 | Braun | |
| 5,015,749 A | 5/1991 | Schmidt et al. | |
| 5,041,584 A | 8/1991 | Crapo et al. | |
| 5,041,585 A | 8/1991 | Deavenport et al. | |
| 5,272,236 A | 12/1993 | Lai et al. | |
| 5,278,272 A | 1/1994 | Lai et al. | |
| 5,542,199 A | 8/1996 | Dreisbach et al. | |
| 5,844,045 A | 12/1998 | Kolthammer et al. | |
| 5,869,575 A | 2/1999 | Kolthammer et al. | |
| 6,054,544 A | 4/2000 | Finlayson et al. | |
| 6,090,376 A | 7/2000 | Dubief et al. | |
| 6,239,244 B1 | 5/2001 | Stepp et al. | |
| 6,335,410 B1 | 1/2002 | Finlayson et al. | |
| 6,448,341 B1 | 9/2002 | Kolthammer et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 6,723,810 B2 | 4/2004 | Finlayson et al. | |
| 6,797,779 B1 | 9/2004 | Ajbani et al. | |
| 2006/0252094 A1 | 11/2006 | Zhou et al. | |
| 2007/0167578 A1 | 7/2007 | Arriola et al. | |
| 2010/0168330 A1 | 7/2010 | Demoirors et al. | |
| 2010/0317804 A1 | 12/2010 | Karjala et al. | |
| 2011/0021713 A1 | 1/2011 | Demirors et al. | |
| 2011/0130533 A1 | 6/2011 | Karjala et al. | |
| 2011/0196105 A1 | 8/2011 | Eddy et al. | |

FOREIGN PATENT DOCUMENTS

| | | |
|---|---|---|
| EP | 0217585 | 4/1987 |
| GB | 1209503 | 10/1970 |
| JP | 2252782 | 10/1990 |
| JP | 4091217 | 3/1992 |
| JP | 2001080299 | 3/2001 |
| WO | 9829508 | 7/1998 |
| WO | 0192357 | 12/2001 |
| WO | 03091262 | 11/2003 |
| WO | 2005021622 | 3/2005 |
| WO | 2007136495 | 11/2007 |
| WO | 2007136496 | 11/2007 |
| WO | 2007136497 | 11/2007 |
| WO | 2007136506 | 11/2007 |
| WO | 2010141557 | 12/2010 |
| WO | 2010144784 | 12/2010 |
| WO | 2011019563 | 2/2011 |

OTHER PUBLICATIONS

Bovey (Macromolecules 1976 p. 76).*
Randall (J Polymer Science 1973 p. 275).*
Odian (Principles of Polymerization, 4th ed. 2004 p. 300).*
Ciolino, A.E. et al "Novel synthesis of polyethylene-poly(dimethylsiloxane) copolymers with metallocene catalyst" Journal of Polymer Science Part A: Polymer Chermistry vol. 42, No. 10 Apr. 8, 2004 p. 2462-2473.
Zimm B.H, J. Chem. Phys., 16, 1099 (1948).
Mohajery P., "Synthesis and properties of poly(ethylene oxide)-grafted polyethylene copolymer and terpolymer" Polymers for Advanced Technoloies, vol. 21. No. 1 Feb. 23, 2009.

(Continued)

Primary Examiner — Robert Jones, Jr.
(74) Attorney, Agent, or Firm — Whyte Hirschboeck Dudek S.C.

(57) ABSTRACT

A polymer comprises units derived from ethylene and poly (alkoxide) the polymer having at least 0.15 units of amyl groups per 1000 carbon atoms as determined by 13C Nuclear Magnetic Resonance (NMR).

10 Claims, 6 Drawing Sheets

(56) References Cited

OTHER PUBLICATIONS

Neugebauer D., Graft copolymers with poly(ethylene oxide) segments, Polymer Internaional vol. 56 No. 12 Aug. 8, 2007.

Yau, W.W., "Examples of Using 3D-GPC-TREF for Polyolefin Characterization" Macromol Symp. 2007, 257, 29-45.

* cited by examiner

$^{13}$C NMR Spectrum of LDPE Showing Location of Peaks Characteristic of Different Branch Types C53 refers to the 3rd carbon in a 5-carbon branch, with the methyl counted as carbon 1.

$^{13}$C NMR Spectrum of LDPE Showing an Example of Quantification of C5 Branches/1000C

$^{13}$C NMR Spectrum of LDPE Containing C1 Branches

$^{13}$C NMR Spectrum of a HDPE Containing C3 (Propyl) Branches from a Pentene Comonomer

¹³C NMR Spectrum of a Representative Inventive PEGPG-LDPE Polymer Showing the Characteristic Peaks of PEGPG

Molecular Weight Distribution of Examples and Comparative Examples

Relationship of Peak Melting Temperature Tm and Density of Examples, Commercially Available LDPE and Comparative Polymers Relationship of Heat of Fusion and Density of Examples, Commercially Available LDPE and Comparative Polymers

DMS Overlay of Examples and Comparative Examples

US 8,598,276 B2

POLYMERS COMPRISING UNITS DERIVED FROM ETHYLENE AND POLY(ALKOXIDE)

CROSS-REFERENCE TO RELATED APPLICATIONS

The present application claims the benefit of U.S. Provisional Application No. 61/242,133, filed on Sep. 14, 2009, and fully incorporated herein by reference.

BACKGROUND

Conventional low density polyethylene (LDPE) exhibits good processability. Poly(alkoxides) exhibit good processing aid properties. The combination of these properties is desirable, but blends of these polymers are difficult to use due to their tendency to phase separate. Grafting one polymer to the other using peroxide/reactive extrusion is know, but the process leaves a substantial portion of the LDPE ungrafted which, in turn, tends to phase separate from the grafted polymer and any ungrafted poly(alkoxide). Accordingly, a need exists for a polymer of poly(alkoxide) and LDPE, and a process for making it.

SUMMARY OF THE INVENTION

In one embodiment, the invention is a polymer comprising units derived from ethylene and poly(alkoxide), the polymer having at least 0.15 units of amyl groups per 1000 carbon atoms as determined by $^{13}$C Nuclear Magnetic Resonance (NMR). The polymer comprises a poly(alkoxide) with ethylene-based polymeric branches. The measure of 0.15 amyl groups per 1000 carbon atoms is based on the number of carbon atoms in the ethylene-based polymeric branches exclusive of the carbon atoms that form a part of the poly(alkoxide).

In one embodiment, the invention is a process to form a polymer comprising units derived from ethylene and poly(alkoxide), the process comprising:

A. Contacting at least one poly(alkoxide) with ethylene in the presence of a free-radical initiator in a first reactor or a first part of a multi-part reactor; and B. Reacting the poly(alkoxide) with additional ethylene in the presence of the free-radical initiator to form an ethylene-based polymeric branch bonded to the poly(alkoxide) in at least one other reactor or a later part of the multi-part reactor.

DETAILED DESCRIPTION

Figure 1:
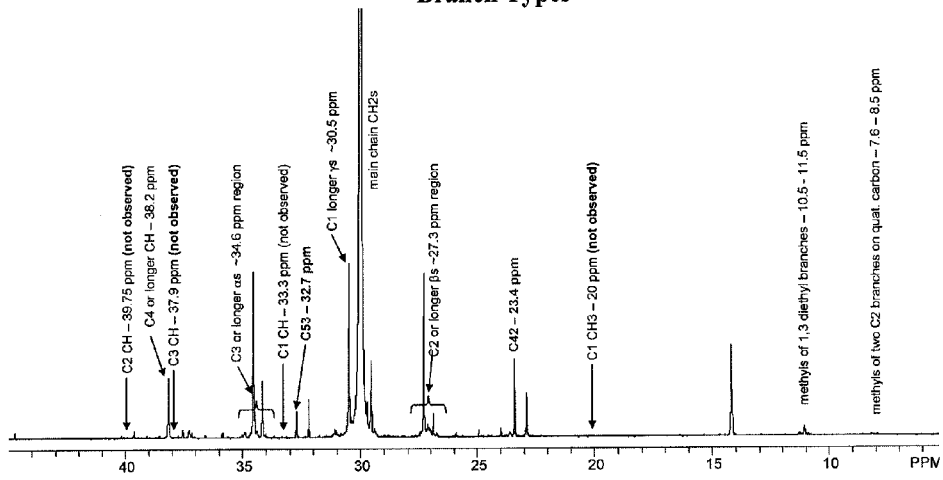
FIG. 1 is a $^{13}$C NMR spectrum of LDPE showing locations of peaks characteristic of different branch types.

The following discussion is presented to enable a person skilled in the art to make and use the disclosed compositions and methods. The general principles described may be applied to embodiments and applications other than those detailed without departing from the spirit and scope of the disclosed compositions and methods. The disclosed compositions and methods are not intended to be limited to the embodiments shown, but is to be accorded the widest scope consistent with the principles and features disclosed.

Inventive Polymer

The term "ethylene-based polymeric branch" refers to a polymeric unit comprising polymerized ethylene and which is bonded to a polyalkylene. In one embodiment the inventive polymer (sometimes referred to as an "ethylenic polymer") comprises the structural formula of Formula 1.

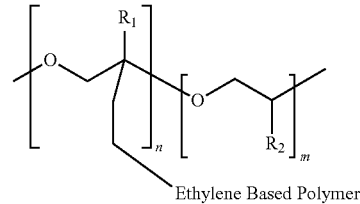

(1)

Ethylene Based Polymer

In Formula 1 the ethylene-based polymeric branch can be a homopolymer, e.g., LDPE, or an interpolymer, such as an ethylene-propylene copolymer branch. The polymer comprises a poly(alkoxide) unit with an ethylene-based polymeric branch covalently attached at a backbone carbon atom. The phrase "unit derived from a poly(alkoxide)" can refer to a oligomeric or polymeric unit of the poly(alkoxide). The ethylene-based polymeric branch is either formed directly on the poly(alkoxide), i.e., an ethylene monomer or oligomer attaches at the poly(alkoxide) and is subsequently polymerized or further polymerized with other ethylene monomers (or copolymerized with one or more olefin comonomers) to form the ethylene-based polymeric branch, or an ethylene-based polymer is formed independently and subsequently grafted to the poly(alkoxide). The poly(alkoxide) can contain one or more ethylene-based polymeric branches, the number of branches on any poly(alkoxide) is a function, at least in part, of the size of the poly(alkoxide) and the conditions under which the ethylene is polymerized or the polyethylene is grafted to the poly(alkoxide). The ethylene-based polymeric branches can vary in size and structure, but typically and preferably comprise one or more long chain branches (LCB, which are characteristic of high pressure LDPE). If the ethylene-based polymer from which the ethylene-based polymeric branches are derived is made by a high pressure process and/or contains long chain branching, then sometimes this polymer, or branches derived from this polymer, is known as a highly branched ethylene-based polymer.

Currently, when a poly(alkoxide) is used with a low crystallinity, highly branched ethylene-based polymer, there is no mechanical means to create a blend that faithfully combines all the physical performance advantages of the poly(alkoxide)

with the all the favorable processing characteristics of the highly branched ethylene-based polymer. Disclosed are compositions and methods that address this shortcoming. A benefit of the disclosed compositions and methods is the ability to produce resins with a higher polymer density using conventional processes that have the processibility of the highly branched ethylene-based polymer in conjunction with physical properties akin to the physical properties associated with the poly(alkoxide).

The covalent bonding of the two constituents—a poly (alkoxide) and a highly branched ethylene-based polymer—results in a polymer with physical properties akin to or better than the poly(alkoxide) component while maintaining processability characteristics akin to the highly branched ethylene-based polymer component.

The combination of physical and processing properties for the disclosed polymers of this invention is not observed in mere blends of polyalkylene with highly branched ethylene-based polymers. The unique chemical structure of the disclosed polymers of this invention is advantageous as the poly(alkoxide) and the highly branched ethylene-based polymer substituent are covalently linked.

The polymer of this invention may comprise unreacted poly(alkoxide). The polymer of this invention may also comprise free or unattached ethylene-based polymer that formed or was introduced into the process of making the inventive polymer but did not bond with the poly(alkoxide). The poly(alkoxide) that is not bonded to an ethylene-based polymer and the ethylene-based polymer that is not bonded to a poly(alkoxide) are usually present at low levels, or can be removed to low levels, through various purification or recovery methods known to those skilled in the art.

In one embodiment the polymer comprises units derived from ethylene and poly(alkoxide), the polymer having at least 0.15, typically at least 0.5 and more typically at least 0.8 units, of amyl groups per 1000 carbon atoms as determined by $^{13}$C Nuclear Magnetic Resonance (NMR). Typically the polymer has one or more of: (1) one, typically at least 1.2 and more typically at least 1.4, units of C6+ branches per 1000 carbon atoms as determined by $^{13}$C NMR, (2) no appreciable methyl branches per 1000 carbon atoms as determined by $^{13}$C NMR; (3) no appreciable propyl branches per 1000 carbon atoms as determined by $^{13}$C NMR, and (4) no greater than 5, typically no greater than 3 and more typically no greater than 2, units of amyl groups per 1000 carbon atoms as determined by $^{13}$C NMR. In one embodiment the polymer, or the ethylene-based polymeric branches of the polymer, has two, three or all four of these properties.

In one embodiment the polymer has a density greater than 0.90 or 0.91 or 0.92, and less than 0.95 or 0.945 or 0.94, grams per cubic centimeter (g/cc or g/cm$^3$) as measured by ASTM D 792. In one embodiment the polymer has a density of 0.90 to 0.95, or 0.91 to 0.945 or 0.92 to 0.94, g/cc.

In one embodiment the polymer has a melt index from 0.01 to 100, typically from 0.05 to 50 and more typically from 0.1 to 20, grams per 10 minutes (g/10 min) as measured by ASTM 1238-04 (2.16 kg/190° C.).

In one embodiment less than 60, 50, 40, 30, 20 or 10 weight percent of the poly(alkoxide) used in the process to make the inventive polymer is extractable by solvent extraction from the polymer.

In one embodiment, the invention is a composition comprising a polymer comprising units derived from ethylene and poly(alkoxide), the polymer having at least 0.15 units of amyl groups per 1000 carbon atoms as determined by $^{13}$C NMR. In one embodiment, the invention is an article comprising such a composition, and in one embodiment the invention is an article comprising a component comprising such a composition. In one embodiment the article is a film.

In one embodiment the polymer comprises a majority weight percent of polymerized ethylene based on the weight of the polymer.

In order to achieve an improvement of physical properties over and above a mere physical blend of at least one poly(alkoxide) with a highly branched ethylene-based polymer, it was found that the covalent bonding formed by polymerization of the highly branched ethylene-based polymer in the presence of the poly(alkoxide) results in an ethylenic polymer material with physical properties akin to, or better than, the at least one poly(alkoxide)-based polymer component, while maintaining processability characteristics akin to the highly branched ethylene-based polymer component. It is believed that the disclosed ethylenic polymer structure is comprised of highly branched ethylene-based polymer substituents grafted to, or "free-radical polymerization generated ethylene-based long chain polymer branches" originating from a radicalized site on the at least one poly(alkoxide)-based polymer. The disclosed composition is an ethylenic polymer comprised of at least one poly(alkoxide)-based polymer with long chain branches of highly branched ethylene-based polymer.

The melt index of the disclosed ethylenic polymer may be from about 0.01 to about 1000 g/ 10 minutes, as measured by ASTM 1238-04 (2.16 kg and 190° C.).

Poly(alkoxides)

Suitable poly(alkoxide)-based polymers comprise repeating units as illustrated in Formula 2

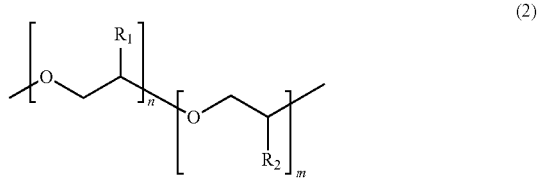

(2)

in which each R1 and R2 are independently hydrogen or alkyl with the proviso that R1 and R2 cannot simultaneously be hydrogen, and each m and n is independently an integer typically greater than or equal to 10, more typically greater than or equal to 50, and even more typically equal to or greater than 100. The maximum value of each m and n value is a function of cost and practical polymerization considerations. In one embodiment each R1 and R2 is independently hydrogen or a C1-C6 alkyl, preferably a C1-C3 alkyl and even more preferably methyl. The end groups are typically independently hydroxyl.

Poly(alkoxides) which can be employed in the present invention include poly(ethylene oxides), poly(propylene oxides) and mixed poly(ethylene oxide)/poly(propylene oxide) compounds. The poly(alkoxides) preferably are of the formula: P"O—(CH$_2$CH$_2$O—)$_x$—(CH$_2$CHRO—)$_y$(CH$_2$CH$_2$O—)$_z$Q, wherein x, y and z are independently zero or positive integers, provided that at least one of x, y and z is not zero; R is H or an alkyl, such as a C$_{1-4}$ alkyl, particularly a methyl, group, P" is a capping group or a labeling group, and Q is a group permitting coupling. When x, y or z are not zero, they are typically up to 1000. In some embodiments, x is from 3 to 1000, for example from 100 to 500, and both y and z are zero. In other embodiments, x and y are independently from 3 to 1000, for example from 100 to 500, and z is zero. In yet other embodiments, x and z are independently from 3 to 500, for example from 100 to 300, and y is from 3 to 1000, for example from 100 to 500. Preferably, the poly(alkyleneoxide) is capped, for example by a $C_{1-4}$ alkyl, especially a methyl, group.

The poly(alkoxide) compounds employed are commonly identified by their approximate average molecular weight and abbreviated chemical name (for example PEG=poly(ethylene glycol); PPG=polypropylene glycol). The poly(alkoxide) may be linear or branched, and commonly has an average molecular weight of from 0.2 kD to 60 kD, for example from 2 kD to 40 kD. When the poly(alkoxide) is branched, the group, Q, permitting coupling may carry two or more poly (alkylene oxide) chains. For example, Q may represent a lysine or equivalent moiety carrying two poly(alkylene oxide) chains, and an activated ester, especially an NHS group. Preferably, the poly(alkoxide) is PEG.

Highly Branched Ethylene-Based Polymers

Highly branched ethylene-based polymers, such as low density polyethylene (LDPE), can be made using a high-pressure process using free-radical chemistry to polymerize ethylene monomer. Typical polymer density is from 0.91 to 0.94 g/cm³. The low density polyethylene may have a melt index ($I_2$) from 0.01 to 150 g/10 minutes. Highly branched ethylene-based polymers such as LDPE may also be referred to as "high pressure ethylene polymers", meaning that the polymer is partly or entirely homopolymerized or copolymerized in autoclave or tubular reactors at pressures above 13,000 psig with the use of free-radical initiators, such as peroxides (see, for example, U.S. Pat. No. 4,599,392 (McKinney, et al.)). The process creates a polymer with significant branches, including long chain branches, out of the monomer/comonomer material.

Highly branched ethylene-based polymers are typically homopolymers of ethylene; however, the polymer may comprise units derived from one or more a-olefin copolymers as long as there is at least 50 mole percent polymerized ethylene monomer in the polymer.

Comonomers that may be used in forming highly branched ethylene-based polymer include, but are not limited to, α-olefin comonomers, typically having no more than 20 carbon atoms. For example, the α-olefin comonomers, for example, may have 3 to 10 carbon atoms; or in the alternative, the α-olefin comonomers, for example, may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In the alternative, exemplary comonomers include, but are not limited to α, β-unsaturated $C_3$-$C_8$-carboxylic acids, in particular maleic acid, fumaric acid, itaconic acid, acrylic acid, methacrylic acid and crotonic acid derivates of the α, β-unsaturated $C_3$-$C_8$-carboxylic acids, for example unsaturated $C_3$-$C_{15}$-carboxylic acid esters, in particular ester of $C_1$-$C_6$-alkanols, or anhydrides, in particular methyl methacrylate, ethyl methacrylate, n-butyl methacrylate, ter-butyl methacrylate, methyl acrylate, ethyl acrylate n-butyl acrylate, 2-ethylhexyl acrylate, tert-butyl acrylate, methacrylic anhydride, maleic anhydride, and itaconic anhydride. In another alternative, the exemplary comonomers include, but are not limited to, vinyl carboxylates, for example vinyl acetate. In another alternative, exemplary comonomers include, but are not limited to, n-butyl acrylate, acrylic acid and methacrylic acid.

Process

The poly(alkoxide) may be produced before or separately from the reaction process with the highly branched ethylene-based polymer. In other disclosed processes, the poly(alkoxide) may be formed in situ and in the presence of highly branched ethylene-based polymer within a well-stirred reactor such as a tubular reactor or an autoclave reactor. The highly branched ethylene-based polymer is formed in the presence of ethylene.

The ethylenic polymer is formed in the presence of ethylene. Two processes—free radical grafting of highly branched ethylene-based polymer molecules onto a radicalized poly (alkoxide) molecule and free-radical ethylene polymerization to form a long chain branch from a radicalized poly(alkoxide) site—are well known for forming the embodiment ethylenic polymers. Other embodiment processes for formation of the poly(alkoxide), the substituent highly branched ethylene-based polymer, and their combination into the disclosed ethylenic polymer may exist.

In one embodiment the poly(alkoxide) further comprises an extractable hydrogen. The poly(alkoxide) enters an area, such as a reactor, in which free-radical polymerization of ethylene monomer into a highly branched ethylene-based polymer is supported.

At some point during this step, a free-radical bearing molecule, such as a peroxide initiator breaks down product or a growing, highly branched ethylene-based polymer chain, interacts with the poly(alkoxide) by extracting the extractable hydrogen and transfers the free radical to the poly(alkoxide). Methods for extracting the extractable hydrogen from the poly(alkoxide) include, but are not limited to, reaction with free radicals which are generated by homolytically cleaving molecules (for instance, peroxide-containing compounds or azo-containing compounds) or by external radiation.

In one embodiment the poly(alkoxide) further comprises a radicalized site after hydrogen extraction. At this point in the process, and in the presence of ethylene, either a growing, highly branched ethylene-based polymer chain or ethylene monomer interacts with the radicalized site to attach to (via termination) or form a long chain branch (through polymerization). These reactions may occur several times with the same poly(alkoxide). The inventive process may comprise one or more embodiments as described herein.

In one embodiment the highly branched ethylene-based polymer and the poly(alkoxide) are prepared externally to the reaction process used to form the embodiment ethylenic polymer, are combined in a common reactor in the presence of ethylene under free-radical polymerization conditions, and the two polymers are subjected to process conditions and reactants to effect the formation of the embodiment ethylenic polymer.

In another embodiment process, the highly branched ethylene-based polymer and the poly(alkoxide) are both prepared in different forward parts of the same process and are then combined together in a common downstream part of the process in the presence of ethylene under free-radical polymerization conditions. The poly(alkoxide) and the substituent highly branched ethylene-based polymer are made in separate forward reaction areas or zones, such as separate autoclaves or an upstream part of a tubular reactor. The products from these forward reaction areas or zones are then transported to and combined in a downstream reaction area or zone in the presence of ethylene under free-radical polymerization conditions to facilitate the formation of an embodiment ethylenic polymer. In some processes, free radical generating compounds are added to the downstream reaction area or zone to facilitate the reaction. In some other processes, a catalyst is added to facilitate and reactions in the downstream reaction area or zone. In some other processes, additional fresh ethylene is added to the process downstream of the forward reaction areas or zones to facilitate both the formation of and grafting of highly branched ethylene-based polymers to the poly(alkoxide) and the reaction of ethylene monomer directly with the poly(alkoxide) to form the disclosed ethylenic polymer. In some other processes, at least one of the product streams from the forward reaction areas or zones is treated before reaching the downstream reaction area or zone to neutralize any residue or byproducts that may inhibit the downstream reactions.

In an in situ process the poly(alkoxide) is created in a first or forward reaction area or zone, such as a first autoclave or an upstream part of a tubular reactor. The resultant product stream is then transported to a downstream reaction area or zone where the there is a presence of ethylene at free-radical polymerization conditions. These conditions support both the formation of and grafting of highly branched ethylene-based polymer to the poly(alkoxide) occurs as well as the reaction of ethylene monomer directly with at least one radicalized site on the poly(alkoxide), thereby forming an embodiment ethylenic polymer. In some embodiment processes, free radical generating compounds are added to the downstream reaction area or zone to facilitate the grafting reaction. In some other embodiment processes, a catalyst is added to facilitate grafting and reactions in the downstream reaction area or zone. In some other embodiment processes, additional fresh ethylene is added to the process downstream of the forward reaction areas or zones to facilitate both the formation and grafting of highly branched ethylene-based polymer to and the reaction of ethylene monomer with the poly(alkoxide) to form the disclosed ethylenic polymer. In some embodiment processes, the product stream from the forward reaction area or zone is treated before reaching the downstream reaction area or zone to neutralize any residue or byproducts from the previous reaction that may inhibit the highly branched ethylene-based polymer formation, the grafting of highly branched ethylene-based polymer to the poly(alkoxide), or the reaction of ethylene monomer with the poly(alkoxide) to form the disclosed ethylenic polymer.

Any suitable method may be used for feeding the poly (alkoxide) into a reactor where it may be reacted with a highly branched ethylene-based polymer.

For producing the highly branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters, preferably from 1000 to 2000 meters. The beginning of a reaction zone for either type of reactor is defined by the side injection of either initiator of the reaction, ethylene, telomer, comonomer(s) as well as any combination thereof. A high pressure process can be carried out in autoclave or tubular reactors having at least 2 reaction zones or in a combination of autoclave and tubular reactors, each comprising one or more reaction zones.

In embodiment processes the initiator is injected prior to the reaction zone where free radical polymerization is to be induced. In other embodiment processes, the poly(alkoxide) may be fed into the reaction system at the front of the reactor system and not formed within the system itself.

Embodiment processes may include a process recycle loop to improve conversion efficiency. In such embodiment processes, the downstream reaction area or zone may be maintained at a temperature which is lower than that at which the highly branched ethylene-based polymer would phase separate from the poly(alkoxide). The reactor in which the copolymerization takes place preferably is a reactor with a high polymer ("solids") concentration, such as a loop reactor, to maximize the concentration of polymerizable highly branched ethylene-based polymer in the reactor. In some embodiment processes the recycle loop may be treated to neutralize residues or byproducts from the previous reaction cycle that may inhibit polymerization of either the poly (alkoxide) or the highly branched ethylene-based polymer or inhibit the reaction forming the disclosed ethylenic polymer. In some embodiment processes, fresh monomer is added to this stream.

Ethylene used for the production highly branched ethylene-based polymer may be purified ethylene, which is obtained by removing polar components from a loop recycle stream or by using a reaction system configuration such that only fresh ethylene is used for making the poly(alkoxide)s. Typically the ethylene is not purified to make highly branched ethylene-based polymer. In such cases ethylene from the recycle loop may be used.

Embodiment processes may be used for either the homopolymerization of ethylene in the presence of a poly(alkoxide) or copolymerization of ethylene with one or more other comonomers in the presence of a poly(alkoxide), provided that these monomers are copolymerizable with ethylene under free-radical conditions in high pressure conditions to form highly branched ethylene-based polymers.

Chain transfer agents or telogens (CTA) are typically used to control the melt index in a free-radical polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. For high pressure free radical polymerization, these agents can be of many different types, such as saturated hydrocarbons, unsaturated hydrocarbons, aldehydes, ketones or alcohols. Typical CTAs that can be used include, but are not limited to, propylene, isobutane, n-butane, 1-butene, methyl ethyl ketone, propionaldehyde, ISOPAR (ExxonMobil Chemical Co.), and isopropanol. The amount of CTAs to use in the process is about 0.03 to about 10 weight percent of the total reaction mixture.

The melt index (MI or $I_2$) of a polymer, which is inversely related to the molecular weight, is controlled by manipulating the concentration of the chain transfer agent. For free radical polymerization, after the donation of a hydrogen atom, the CTA forms a radical which can react with the monomers, or with an already formed oligomers or polymers, to start a new polymer chain. This means that any functional groups present in the chain transfer agents will be introduced in the polymer chains. A large number of CTAs, for example, propylene and 1-butene which have an olefinically unsaturated bond, may also be incorporated in the polymer chain themselves, via a copolymerization reaction. Polymers produced in the presence of chain transfer agents are modified in a number of physical properties such as processability, optical properties such as haze and clarity, density, stiffness, yield point, film draw and tear strength.

Hydrogen has been shown to be a chain transfer agent for high pressure free radical polymerization. Control of the molecular weight made in the reaction zones for disclosed processes may be accomplished by feeding hydrogen to the reaction zones where catalyst or initiator is injected. The final product melt index control would be accomplished by feeding chain transfer agents to the reaction zones where free radical polymerization takes place. Feed of the free radical chain transfer agents could be accomplished by direct injection into the reaction zones or by feeding them to the front of the reactor. If hydrogen is fed to the front of the reactor, it would not be expected to act as a chain transfer agent until entering reaction zones where initiator is injected, at which point the unsaturated chain transfer agents would be expected to interact with growing polymer chains. In some embodiment processes, it may be necessary to remove excess CTA from the recycle stream or limit injection so as to prevent excess buildup of CTA in the front end of the process.

The type of free radical initiator used in disclosed processes is not critical. Free radical initiators that are generally used to produce ethylene-based polymers are oxygen, which is usable in tubular reactors in conventional amounts of between 0.0001 and 0.005 wt. % drawn to the weight of polymerizable monomer, and peroxides. Preferred initiators are t-butyl peroxy pivalate, di-t-butyl peroxide, t-butyl peroxy acetate and t-butyl peroxy- 2-hexanoate or mixtures thereof. These organic peroxy initiators are used in conventional amounts of between 0.005 and 0.2 wt. % drawn to the weight of polymerizable monomers.

The peroxide initiator may be, for example, an organic peroxide. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals.

Exemplary cyclic peroxides include, but are not limited to, 3,6,9-triethyl-3,6,9-trimethyl-1,4,7-triperoxonane. Such cyclic peroxides, for example, are commercially available under the trademark TRIGONOX 301 (Akzo Nobel; Arnhem, The Netherlands). Exemplary diacyl peroxides include, but are not limited to, di(3,5,5-trimethylhexanoyl)peroxide. Such diacyl peroxides, for example, are commercially available under the trademark TRIGONOX 36 (Akzo Nobel). Exemplary dialkyl peroxides include, but are not limited to, 2,5-dimethyl-2,5-di(tert-butylperoxy)hexane; 2,5-dimethyl-2,5-di(tert-butylperoxy)hexyne-3; di-tert-amyl peroxide; di-tert-butyl peroxide; and tert-butyl cumyl peroxide. Such dialkyl peroxides, for example, are commercially available under the trademarks TRIGONOX 101, TRIGONOX 145, TRIGONOX 201, TRIGONOX B, and TRIGONOX T (Akzo Nobel). Exemplary hydroperoxides include, but are not limited to, tert-Amyl hydroperoxide; and 1,1,3,3-tetramethylbutyl hydroperoxide. Such hydroperoxides, for example, are commercially available under the trademarks TRIGONOX TAHP, and TRIGONOX TMBH (Akzo Nobel). Exemplary peroxycarbonates include, but are not limited to, tert-butylperoxy 2-ethylhexyl carbonate; tert-amylperoxy 2-ethylhexyl carbonate; and tert-butylperoxy isopropyl carbonate. Such peroxycarbonates, for example, are commercially available under the trademarks TRIGONOX 117, TRIGONOX 131, and TRIGONOX BPIC (Akzo Nobel). Exemplary peroxydicarbonates include, but are not limited to, di(2-ethylhexyl) peroxydicarbonates; and di-sec-butyl peroxydicarbonates. Such peroxydicarbonates, for example, are commercially available under the trademark TRIGONOX EHP, and TRIGONOX SBP (Akzo Nobel). Exemplary peroxyesters include, but are not limited to, tert-amyl peroxy-2-ethylhexanoate; tert-amyl peroxyneodecanoate; tert-amyl peroxypivalate; tert-amyl peroxybenzoate; tert-amyl peroxyacetate; 2,5-dimethyl-2,5-di(2-ethylhexanoylperoxy)hexane; tert-butyl peroxy-2-ethylhexanoate; tert-butyl peroxyneodecanoate; tert-butyl peroxyneoheptanoate; tert-butyl peroxypivalate; tert-butyl peroxydiethylacetate; tert-butyl peroxyisobutyrate; 1,1,3,3-tetramethylbutyl peroxy-2-ethylhexanoate; 1,1,3,3-tetramethylbutyl peroxyneodecanoate; 1,1,3,3-tetramethylbutyl peroxypivalate; tert-butyl peroxy-3,5,5-trimethylhexanoate; cumyl peroxyneodecanoate; tert-butyl peroxybenzoate; and tert-butyl peroxyacetate. Such peroxyesters solvents, for example, are commercially available under the trademarks TRIGONOX 121; TRIGONOX 123; TRIGONOX 125; TRIGONOX 127; TRIGONOX 133; TRIGONOX 141; TRIGONOX 21; TRIGONOX 23; TRIGONOX 257; TRIGONOX 25; TRIGONOX 27; TRIGONOX 41; TRIGONOX 421; TRIGONOX 423; TRIGONOX 425; TRIGONOX 42; TRIGONOX 99; TRIGONOX C; and TRIGONOX F (Akzo Nobel). Exemplary peroxyketals include, but are not limited to, 1,1-di(tert-amylperoxy)cyclohexane; 1,1-di(tert-butylperoxy)cyclohexane; 1,1-di(tert-butylperoxy)-3,3,5-trimethylcyclohexane; and 2,2-di(tert-butylperoxy)butane. Such peroxyketals, for example, are commercially available under the trademarks TRIGONOX 122, TRIGONOX 22, TRIGONOX 29, and TRIGONOX D (Akzo Nobel). The free radical initiator system may, for example, include a mixture or combination of any of the aforementioned peroxide initiators. The peroxide initiator may comprise less than 60 percent by weight the free radical initiator system.

The free radical initiator system further includes at least one hydrocarbon solvent. The hydrocarbon solvent may, for example, be a $C_5$ to $C_{30}$ hydrocarbon solvent. Exemplary hydrocarbon solvents include, but are not limited to, mineral solvents, normal paraffinic solvents, isoparaffinic solvents, cyclic solvents, and the like. The hydrocarbon solvents may, for example, be selected from the group consisting of n-octane, iso-octane (2,2, 4-trimethylpentane), n-dodecane, iso-dodecane (2,2,4,6,6-pentamethylheptane), and other isoparaffinic solvents. Exemplary hydrocarbon solvents such as isoparaffinic solvents, for example, are commercially available under the trademarks ISOPAR C, ISOPAR E, and ISOPAR H (ExxonMobil Chemical Co.). The hydrocarbon solvent may comprise less than 99 percent by weight of the free radical initiator system.

In some embodiment processes, the free radical initiator system may further include a polar co-solvent. The polar co-solvent may be an alcohol co-solvent, for example, a $C_1$ to $C_{30}$ alcohol. Additionally, the alcohol functionality of the alcohol co-solvent may, for example, be mono-functional or multi-functional. Exemplary alcohols as a polar co-solvent include, but are not limited to, isopropanol (2-propanol), allylalcohol (1-pentanol), methanol, ethanol, propanol, butanol, 1,4-butanediol, combinations thereof, mixtures thereof, and the like. The polar co-solvent may comprise less than 40 percent by weight of the free radical initiator system.

The polar co-solvent may be an aldehyde. Aldehydes are generally known to a person of skill in the art; for example, propionaldehyde may be used as a polar co-solvent. However, the reactivity potential of aldehydes as chain transfer agents should be taken into account when using such aldehydes as polar co-solvents. Such reactivity potentials are generally known to a person of skill in the art.

The polar co-solvent may be a ketone. Ketones are generally known to a person of skill in the art; for example, acetone may be used as polar co-solvents. However, the reactivity potential of ketones as chain transfer agents should be taken into account when using such ketones as polar co-solvents. Such reactivity potentials are generally known to a person of skill in the art.

In some embodiment processes, the free radical initiator system may further comprise a chain transfer agent as a solvent or as a blend for simultaneous injection. As previously discussed, chain transfer agents are generally known to a person of skill in the art, and they include, but are not limited to, propane, isobutane, acetone, propylene, isopropanol, butene-1, propionaldehyde, and methyl ethyl ketone. In other disclosed processes, chain transfer agent may be charged into the reactor via a separate inlet port from the initiator system. In another embodiment process, a chain transfer agent may be blended with ethylene, pressurized, and then injected into the reactor in its own injection system.

In some embodiment processes, a peroxide initiator may initially be dissolved or diluted in a hydrocarbon solvent, and then a polar co-solvent added to the peroxide initiator/hydrocarbon solvent mixture prior to metering the free radical initiator system into the polymerization reactor. In another embodiment process, a peroxide initiator may be dissolved in the hydrocarbon solvent in the presence of a polar co-solvent.

In some embodiment processes, the free-radical initiator used in the process may initiate the graft site on the poly (alkoxide) by extracting the extractable hydrogen from the poly(alkoxide). Example free-radical initiators include those free radical initiators previously discussed, such as peroxides and azo compounds. In some other embodiment processes, ionizing radiation may also be used to free the extractable hydrogen and create the radicalized site on the poly(alkoxide). Organic initiators are preferred means of extracting the extractable hydrogen, such as using dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, lauryl peroxide, and tert-butyl peracetate, t-butyl α-cumyl peroxide, di-t-butyl peroxide, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A preferred azo compound is azobisisobutyl nitrite.

In some embodiment processes, processing aids, such as plasticizers, can also be included in the embodiment ethylenic polymer product. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex).

In some embodiment processes, embodiment ethylenic polymers are treated with one or more stabilizers, for example, antioxidants, such as IRGANOX 1010 and IRGAFOS 168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The embodiment ethylenic polymer composition may, for example, comprise less than 10 percent by the combined weight of one or more additives, based on the weight of the embodiment ethylenic polymer.

The embodiment ethylenic polymer (inventive polymer) may further be compounded with one or more other polymers or additives. In some embodiment ethylenic polymer compositions, one or more antioxidants may further be compounded into the polymer and the compounded polymer pelletized. The compounded ethylenic polymer may contain any amount of one or more antioxidants. For example, the compounded ethylenic polymer may comprise from about 200 to about 600 parts of one or more phenolic antioxidants per one million parts of the polymer. In addition, the compounded ethylenic polymer may comprise from about 800 to about 1200 parts of a phosphite-based antioxidant per one million parts of polymer. The compounded disclosed ethylenic polymer may further comprise from about 300 to about 1250 parts of calcium stearate per one million parts of polymer.

Uses

The embodiment ethylenic polymer may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the embodiment ethylenic polymer include blends with other natural or synthetic materials, polymers, additives, reinforcing agents, ignition resistant additives, antioxidants, stabilizers, colorants, extenders, crosslinkers, blowing agents, and plasticizers.

The embodiment ethylenic polymer may be used in producing fibers for other applications. Fibers that may be prepared from the embodiment ethylenic polymer or blends thereof include staple fibers, tow, multi-component, sheath/core, twisted, and monofilament. Suitable fiber forming processes include spin bonded, melt blown techniques, as disclosed in U.S. Pat. No. 4,340,563 (Appel, et al.), U.S. Pat. No. 4,663,220 (Wisneski, et al.), U.S. Pat. No. 4,668,566 (Nohr, et al.), and U.S. Pat. No. 4,322,027 (Reba), gel spun fibers as disclosed in U.S. Pat. No. 4,413,110 (Kavesh, et al.), woven and nonwoven fabrics, as disclosed in U.S. Pat. No. 3,485,706 (May), or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

The embodiment ethylenic polymer may be used in a variety of films, including but not limited to clarity shrink films, collation shrink films, cast stretch films, silage films, stretch hood, sealants, and diaper backsheets.

The embodiment ethylenic polymer is also useful in other direct end-use applications. The embodiment ethylenic polymer is useful for wire and cable coating operations, in sheet extrusion for vacuum forming operations, and forming molded articles, including the use of injection molding, blow molding process, or rotomolding processes. Compositions comprising the embodiment ethylenic polymer can also be formed into fabricated articles using conventional polyolefin processing techniques.

Other suitable applications for the embodiment ethylenic polymer include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

Further treatment of the embodiment ethylenic polymer may be performed to apply the embodiment ethylenic polymer for other end uses. For example, dispersions (both aqueous and non-aqueous) can also be formed using the present polymers or formulations comprising the same. Frothed foams comprising the embodiment ethylenic polymer can also be formed, as disclosed in PCT Publication No. 2005/021622 (Strandeburg, et al.). The embodiment ethylenic polymer may also be crosslinked by any known means, such as the use of peroxide, electron beam, silane, azide, or other cross-linking technique. The embodiment ethylenic polymer can also be chemically modified, such as by grafting (for example by use of maleic anhydride (MAH), silanes, or other grafting agent), halogenation, amination, sulfonation, or other chemical modification.

Additives may be added to the embodiment ethylenic polymer post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the embodiment ethylenic polymer with other polyolefins may be performed. Suitable polymers for blending with the embodiment ethylenic polymer include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company) and VISTAMAXX™ (ExxonMobil Chemical Co.)) can also be useful as components in blends comprising the embodiment ethylenic polymer.

Blends and mixtures of the embodiment ethylenic polymer may include thermoplastic polyolefin blends (TPO), thermoplastic elastomer blends (TPE), thermoplastic vulcanizates (TPV) and styrenic polymer blends. TPE and TPV blends may be prepared by combining embodiment ethylenic polymers, including functionalized or unsaturated derivatives thereof, with an optional rubber, including conventional block copolymers, especially an SBS block copolymer, and optionally a crosslinking or vulcanizing agent. TPO blends are generally prepared by blending the embodiment polymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779 (Ajbani, et al.).

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, density, melt index, molecular weight, reagent amounts and process conditions.

The term "composition," as here used means a combination of two or more materials. With the respective to the inventive polymer, a composition is the inventive polymer in combination with at least one other material, e.g., an additive, filler, another polymer, catalyst, etc. In the context of this invention, the inventive polymer is not a composition because of the presence of unreacted polyalk(oxide) and/or ethylene-based polymer since the association of these materials with a polymer as described by formula 1 is part of the definition of the inventive polymer.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene based on the weight of the polymer and, optionally, may comprise at least one comonomer.

The term "ethylene-based interpolymer" refers to an interpolymer that comprises a majority amount of polymerized ethylene based on the weight of the interpolymer, and comprises at least one comonomer.

The term "no appreciable" as used in the context of reporting alkyl branches in a $^{13}$C NMR analysis means that at a given signal to noise ratio, the branch was not detectable.

The term "multi-part reactor" as used herein refers to a reactor with multiple reaction zones wherein a reaction zone typically includes a feed port and/or one or more physical barriers.

Additional Embodiments

In one embodiment of the invention, a polymer comprises units derived from ethylene and poly(alkoxide), the polymer having at least 0.15, or at least 0.5, or at least 0.8, units of amyl groups per 1000 carbon atoms as determined by $^{13}$C Nuclear Magnetic Resonance (NMR).

In one embodiment the inventive polymer comprises a portion of the ethylene bonded to one or more carbon atoms.

In one embodiment the inventive polymer comprises at least one ethylene-based polymeric branch bonded to the poly(alkoxide) at a backbone carbon atom.

In one embodiment the ethylene-based polymeric branch bonded to the poly(alkoxide) at a backbone carbon atom of the inventive polymer contains long chain branching.

In one embodiment the inventive polymer of any of the preceding embodiments comprises at least 1, or at least 1.2, or at least 1.4, units of C6+ branches as determined by $^{13}$C NMR.

In one embodiment the inventive polymer of any of the preceding embodiments comprises no greater than 5, or no greater than 3 or no greater than 2, units of amyl groups per 1000 carbon atoms as determined by $^{13}$C NMR.

In one embodiment the inventive polymer of any of the preceding embodiments has a density of less than 0.95 or less than 0.94, g/cm$^3$.

In one embodiment the inventive polymer of any of the preceding embodiments has a melt index ($I_2$) of less than 100, or less than 50, or less than 20, g/10 min.

In one embodiment the inventive polymer of any of the preceding embodiments has a melt index ($I_2$) of greater than 0.1, or greater than 0.5.

In one embodiment the inventive polymer of any of the preceding embodiments has a melt index ($I_2$) of greater than 1, or greater than 2, or greater than 5, g/10 min.

In one embodiment the inventive polymer of any of the preceding embodiments has a melt flow ratio ($I_{10}/I_2$) of least 10 or of at least 15, or of at least 18.

In one embodiment the inventive polymer of any of the preceding embodiments has an $I_{10}/I_2$ of less than 50, less than 45, less than 30.

In one embodiment the inventive polymer of any of the preceding embodiments has an $I_2$ of less than 50, less than 40, less than 30 g/10 min, and an $I_{10}/I_2$ of greater than 10, greater than 15 or greater than 18.

In one embodiment the inventive polymer has a molecular weight distribution (MWD) from 4 to 10, or from 5 to 7.

In one embodiment the inventive polymer comprises from 1 to 30 or from 4 to 20 weight percent poly(alkoxide) based on the weight of the polymer.

In one embodiment the invention is a composition comprising the inventive polymer of any of the preceding polymer embodiments.

In one embodiment the composition of the preceding embodiment comprises one or more additives.

In one embodiment the invention is an article comprising a composition of any of the preceding composition embodiments.

In one embodiment the invention is an article comprising at least one component formed from a composition of any of the composition embodiments.

In one embodiment the article of any of the preceding article embodiments is in the form of a film.

In one embodiment the film has a high Beta ratio (relative diffusion rate of oxygen to carbon dioxide ($CO_2$)) for improved food packaging.

In one embodiment the invention is a process to form a polymer comprising units derived from ethylene and poly(alkoxide), the process comprising:

A. Contacting at least one poly(alkoxide) with ethylene in the presence of a free-radical initiator in a first reactor or a first part of a multi-part reactor; and B. Reacting the poly(alkoxide) with additional ethylene in the presence of the free-radical initiator to form an ethylene-based polymeric branch bonded to the poly(alkoxide) in at least one other reactor or a later part of the multi-part reactor.

In one process embodiment the ethylene-based polymeric branch is formed by the ethylene monomer bonding with the poly(alkoxide) to form an ethylene-poly(alkoxide) moiety, and the resulting moiety polymerizing with at least additional ethylene monomer to form the ethylene-based polymeric branch.

In one process embodiment the ethylene-based polymeric branch is formed independently of the poly(alkoxide) and is then grafted to the poly(alkoxide).

In one embodiment the invention is a polymer made by any of the processes embodiments.

In one embodiment the inventive polymer comprises less than 60, 50, 40, 30, 20 or 10, weight percent of poly(alkoxide) that is extractable by solvent extraction.

In one embodiment the inventive composition comprises less than 60, 50, 40, 30, 20 or 10, weight percent of poly(alkoxide) that is extractable by solvent extraction.

In one embodiment the inventive polymer of any of the preceding embodiments has a peak melting temperature Tm in ° C. and density in g/cm$^3$ that satisfies the mathematical relationship:

$$Tm<771.5 \ (°\text{C.·cc/g})\times(\text{density})-604 \ (°\text{C.}).$$

In one embodiment the inventive polymer of any of the preceding embodiments has a peak melting temperature Tm in ° C. and density in g/cm$^3$ that satisfies the mathematical relationship:

$$Tm<771.5 \ (°\text{C.·cc/g})\times(\text{density})-605.5 \ (°\text{C.}).$$

In one embodiment the inventive polymer of any of the preceding embodiments has a heat of fusion ($H_f$) in Joules/grams (J/g) and density in g/cm$^3$ that satisfies the mathematical relationship:

$$H_f<2333 \ (\text{J·cc/g}^2)\times(\text{density})-2009 \ (\text{J/g}).$$

In one embodiment the inventive polymer of any of the preceding embodiments has a heat of fusion ($H_f$) in Joules/grams (J/g) and density in g/cm$^3$ that satisfies the mathematical relationship:

$$H_f<2333 \ (\text{J·cc/g}^2)\times(\text{density})-2020 \ (\text{J/g}).$$

In one embodiment the inventive polymer of any of the preceding embodiments has a density of at least 0.93 g/cm$^3$.

In one embodiment the inventive polymer has a viscosity ratio V0.1/V100 of at least 8, preferably of at least 10.

In one embodiment the inventive polymer has a viscosity ratio V0.1/V100 less than 30 or less than 20.

In one embodiment the inventive polymer has a viscosity at 0.1 rad per second is greater than 1400, preferably greater than 1800, Pa·s.

In one embodiment the poly(alkoxide) of any of the preceding embodiments is at least one of polyethylene glycol or polypropylene glycol.

In one embodiment the film has a high Beta ratio (relative diffusion rate of oxygen to carbon dioxide ($CO_2$)).

In one embodiment the ethylenic polymer of the preceding embodiments is made by a process comprising the steps of:
A. Contacting at least one poly(alkoxide) with ethylene in the presence of a free-radical initiator in a first reactor or a first part of a multi-part reactor; and
B. Reacting the poly(alkoxide) with additional ethylene in the presence of a free-radical initiator to form an ethylenic polymer in at least one other reactor or a later part of a multi-part reactor.

In one embodiment step (B) of the preceding embodiment occurs by graft polymerization.

In one embodiment the poly(alkoxide) has a viscosity of 200, 500 or 1,000 centistokes (cSt) at 25° C.

In one embodiment the poly(alkoxide) has a viscosity of less than 1 million, 500,000, 100,000 or 50,000 centistokes (cSt) at 25° C.

EXPERIMENTAL

Reference Resins

Thirty commercially available LDPE resins (designated "Commercially Available Resins" or "CAR") are tested for density, melt index ($I_2$), heat of fusion, peak melting temperature, g', gpcBR, and LCBf using the Density, Melt Index, DSC Crystallinity, Gel Permeation Chromatography, g' by 3D-GPC, and gpcBR Branching Index by 3D-GPC methods, all described infra. The Commercially Available Resins have the properties listed in Table 1.

TABLE 1

| CAR Properties | | | | | | |
|---|---|---|---|---|---|---|
| Commercially Available Resins | Density (g/cm³) | Melt Index ($I_2$) (g/10 min) | Heat of Fusion (J/g) | Peak $T_m$ (° C.) | gpcBR Whole | LCBf |
| CAR1 | 0.920 | 0.15 | 147.2 | 110.9 | 1.26 | 2.05 |
| CAR2 | 0.922 | 2.5 | 151.1 | 111.4 | 0.89 | 2.03 |
| CAR3 | 0.919 | 0.39 | 146.8 | 110.4 | 1.19 | 2.39 |
| CAR4 | 0.922 | 0.80 | 155.0 | 112.5 | 0.78 | 1.99 |
| CAR5 | 0.916 | 28 | 139.3 | 106.6 | 1.27 | 3.59 |
| CAR6 | 0.917 | 6.4 | 141.5 | 107.8 | 1.48 | 3.24 |
| CAR7 | 0.924 | 1.8 | 155.1 | 112.2 | 0.77 | 1.84 |
| CAR8 | 0.926 | 5.6 | 157.9 | 113.4 | 0.57 | 1.64 |
| CAR9 | 0.923 | 0.26 | 151.4 | 110.3 | 1.13 | 2.06 |
| CAR10 | 0.924 | 0.22 | 151.2 | 111.4 | 1.03 | 1.96 |
| CAR11 | 0.924 | 0.81 | 154.1 | 112.3 | 0.95 | 2.48 |
| CAR12 | 0.926 | 5.9 | 158.0 | 113.1 | 0.70 | 1.90 |
| CAR13 | 0.924 | 2.0 | 155.2 | 111.8 | 0.84 | 2.03 |
| CAR14 | 0.923 | 4.1 | 157.3 | 111.6 | 1.26 | 2.32 |
| CAR15 | 0.922 | 33 | 153.5 | 111.8 | 0.46 | 1.95 |
| CAR16 | 0.922 | 4.1 | 151.0 | 109.3 | 1.89 | 2.61 |
| CAR17 | 0.918 | 0.46 | 141.2 | 107.4 | 3.09 | 3.33 |
| CAR18 | 0.921 | 2.1 | 145.9 | 110.2 | 0.85 | 2.11 |
| CAR19 | 0.918 | 8.2 | 143.2 | 106.4 | 2.27 | 3.20 |
| CAR20 | 0.922 | 0.67 | 148.7 | 110.4 | 0.68 | 1.59 |
| CAR21 | 0.924 | 0.79 | 154.2 | 111.8 | 0.74 | 1.96 |
| CAR22 | 0.922 | 0.25 | 150.0 | 110.5 | 0.92 | 1.92 |
| CAR23 | 0.924 | 3.4 | 153.6 | 111.3 | 0.65 | 1.94 |
| CAR24 | 0.921 | 4.6 | 148.2 | 106.9 | 1.49 | 2.54 |
| CAR25 | 0.923 | 20 | 150.9 | 108.9 | NM | 2.21 |
| CAR26 | 0.925 | 1.8 | 157.5 | 112.4 | 0.82 | 1.86 |
| CAR27 | 0.923 | 0.81 | 153.7 | 111.5 | 0.87 | 1.94 |
| CAR28 | 0.919 | 6.8 | 145.1 | 105.7 | 1.72 | 2.75 |
| CAR29 | 0.931 | 3.6 | 167.3 | 115.6 | NM | NM |
| CAR30 | 0.931 | 2.3 | 169.3 | 115.8 | NM | NM |

"NM" means not measured.

Test Methods

Density

Samples that are measured for density are prepared according to ASTM D 1928. Samples are pressed at 374° F. (190° C.) and 30,000 psi for 3 minutes, and then at 70° F. (21° C.) and 30,000 psi for 1 minute. Density measurements are made within one hour of sample pressing using ASTM D792, Method B.

Melt Index

Melt index, or $I_2$, is measured in accordance by ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

Viscosity Determination for Poly(alkoxide)

Viscosities up to 100,000 centistokes can be measured by ASTM D-445, IP 71 (at 25° C., constant temperature water bath, equilibration time at least 15 minutes) using a glass capillary viscometer such as an Ubbelohde viscometer. Viscosities above 100,000 centistokes can be measured using rotational viscometers, such as a Brookfield Synchro-lectric viscometer, or a Wells-Brookfield Core/Plate viscometer, available from Brookfield Engineering Laboratories, employing test methods ASTM D-1084 at 25 C (for a cup/spindle viscometer) and ASTM D-4287 at 25 C (for a cone/plate viscometer).

Differential Scanning calorimetry (DSC)

Differential Scanning calorimetry (DSC) can be used to measure the crystallinity of a sample at a given temperature for a wide range of temperatures. For the Examples, a TA model Q1000 DSC (TA Instruments; New Castle, Del.) equipped with an RCS (Refrigerated Cooling System) cooling accessory and an auto-sampler module is used to perform the tests. During testing, a nitrogen purge gas flow of 50 ml/min is used. Resins are compression-molded into 3 mm thick by 1 inch circular plaques at 350° C. for 5 minutes under 1500 psi pressure in air. The sample is then taken out of the press and placed on a counter top to cool to room temperature (~25° C.). A 3-10 mg sample of the cooled material is cut into a 6 mm diameter disk, weighed, placed in a light aluminum pan (ca 50 mg), and crimped shut. The sample is then tested for its thermal behavior.

The thermal behavior of the sample is determined by changing the sample temperature upwards and downwards to create a response versus temperature profile. The sample is first rapidly heated to 180° C. and held at an isothermal state for 3 minutes in order to remove any previous thermal history. Next, the sample is then cooled to −40° C. at a 10° C./min cooling rate and held at −40° C. for 3 minutes. The sample is then heated to 150° C. at a 10° C./min heating rate. The cooling and second heating curves are recorded. The values determined are peak melting temperature ($T_m$), peak crystallization temperature ($T_c$), heat of fusion ($H_f$) (in J/g), and the calculated percent crystallinity for polyethylene samples using Equation 1:

$$\% \text{ Crystallinity} = ((H_f)/(292 \text{ J/g})) \times 100 \quad \text{(Eq. 1)}.$$

The heat of fusion ($H_f$) and the peak melting temperature are reported from the second heat curve. Peak crystallization temperature is determined from the cooling curve.

Gel Permeation Chromatography (GPC)

The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using Equation 2 (as described in Williams and Ward, *J. Polym. Sci.*, Polym. Let., 6, 621 (1968)):

$$M_{polyethylene} = A \times (M_{polystyrene})^B \quad \text{(Eq. 2)},$$

where M is the molecular weight of polyethylene or polystyrene (as marked), A has a value of 0.43, and B is equal to 1.0. Use of this polyethylene calibration to obtain molecular weight distributions and related statistics is defined as the method of Williams and Ward. Other values of A and B in Equation 3 may result from different choices of the Mark-Houwink K and a (sometimes referred to as α) values for polystyrene and polyethylene and are referred to generally as a conventionally calibrated 3D-GPC.

With 3D-GPC absolute weight average molecular weight ("$M_{w, Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log ($M_W$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume offset determination, are obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

gpcBR Branching Index by 3D-GPC

In the 3D-GPC configuration the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 3 and 4:

$$M_{PE} = \left(\frac{K_{PS}}{K_{PE}}\right)^{1/\alpha_{PE}+1} \cdot M_{PS}^{\alpha_{PS}+1/\alpha_{PE}+1}, \qquad \text{(Eq. 3)}$$

and $$[\eta]_{PE} = K_{PS} \cdot M_{PS}^{\alpha+1} / M_{PE}. \qquad \text{(Eq. 4)}$$

The gpcBR branching index is a robust method for the characterization of long chain branching. Yau, Wallace W., "Examples of Using 3D-GPC—TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_w$ by the light scattering (LS) detector using the peak area method. The method avoids the slice-by-slice ratio of light scattering detector signal over the concentration detector signal as required in the g' determination.

$$M_W = \sum_i w_i M_i = \qquad \text{(Eq. 5)}$$

$$\sum_i \left(\frac{C_i}{\sum_i C_i}\right) M_i = \frac{\sum_i C_i M_i}{\sum_i C_i} = \frac{\sum_i LS_i}{\sum_i C_i} = \frac{LS \text{ Area}}{Conc. \text{ Area}}.$$

The area calculation in Equation 5 offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) is obtained by the area method shown in Equation 6:

$$IV = [\eta] = \sum_i w_i IV_i = \qquad \text{(Eq. 6)}$$

$$\sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP \text{ Area}}{Conc. \text{ Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 7 and 8:

$$Mw_{CC} = \sum_i \left(\frac{C_i}{\sum_i C_i}\right) M_i = \sum_i w_i M_i, \qquad \text{(Eq. 7)}$$

and $$[\eta]_{CC} = \sum_i \left(\frac{C_i}{\sum_i C_i}\right) IV_i = \sum_i w_i IV_i. \qquad \text{(Eq. 8)}$$

Equation 9 is used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \qquad \text{(Eq. 9)}$$

where [η] is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The Mw by light scattering (LS) using Equation (5) is commonly referred to as the absolute Mw; while the Mw,cc from Equation (7) using conventional GPC molecular weight calibration curve is often referred to as polymer chain Mw. All statistical values with the "cc" subscript are determined using their respective elution volumes, the corresponding conventional calibration as previously described, and the concentration ($C_i$) derived from the mass detector response. The non-subscripted values are measured values based on the mass detector, LALLS, and viscometer areas. The value of $K_{PE}$ is adjusted iteratively until the linear reference sample has a gpcBR measured value of zero. For example, the final values for α and Log K for the determination of gpcBR in this particular case are 0.725 and −3.355, respectively, for polyethylene, and 0.722 and −3.993 for polystyrene, respectively.

Once the K and α values have been determined, the procedure is repeated using the branched samples. The branched samples are analyzed using the final Mark-Houwink constants as the best "cc" calibration values and applying Equations 5-9.

The interpretation of gpcBR is straight forward. For linear polymers, gpcBR calculated from Equation 9 will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination. In other particular cases, other methods for determining $M_w$ moments may be preferable to the aforementioned technique.

Nuclear Magnetic Resonance ($^{13}$C NMR)

The samples are prepared by adding approximately 2.7 g of a 50/50 mixture of tetrachloroethane-d2/orthodichlorobenzene containing 0.025 M Cr(AcAc)$_3$ (tris(acetylacetonato)-chromium(III)) to 0.25 g sample in a NORELL 1001-7 10 mm NMR tube. The samples are dissolved and homogenized by heating the tube and its contents to 150° C. using a heating block and heat gun. Each sample is visually inspected to ensure homogeneity.

The data are collected using a BRUKER 400 MHz spectrometer equipped with a BRUKER DUAL DUL high-temperature CRYOPROBE. The data are acquired using 320 transients per data file, a 6 second pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. The $^{13}$C NMR chemical shifts are internally referenced to the EEE triad at 30.0 ppm.

Identification and Quantification of Various Branch Types in LDPE

FIG. 1 shows the $^{13}$C NMR spectrum of an LDPE (Sample C-3 below), and indicates characteristic peaks resulting from various branch lengths. Only the most important identifying peaks are labeled. Assignments for the remaining peaks are given in Table 2. C53 refers to the third carbon in a 5-carbon branch with the methyl counted as carbon 1.

TABLE 2

Characteristic Chemical Shifts for Branches of 1 to 6 or More Carbons as Observed in Polyethylene

| Br Length | Methines | Alphas | Betas | Bx1 (Methyl) | Bx2 | Bx3 | Bx4 | Bx5 | Bx6 |
|---|---|---|---|---|---|---|---|---|---|
| 1 | 33.3± | 37.6± | 27.5± | 20.0± | — | — | — | — | — |
| 2 | 39.8± | 34.1± | 27.3* | 11.1± | 26.8± | — | — | — | — |
| 3 | 37.9± | 34.6* | 27.3* | 14.7± | 20.3± | 37.0± | — | — | — |
| 4 | 38.2* | 34.6* | 27.3* | 14.1* | 23.4± | 29.6 | 34.2 | — | — |
| 5 | 38.2* | 34.6* | 27.3* | 14.1* | 22.9* | 32.7± | 26.9 | 34.6* | — |
| 6 or more | 38.2* | 34.6* | 27.3* | 14.1* | 22.9* | 32.2* | 30.4 | 27.3* | 34.6* |
| PE Chain Ends | — | — | — | 14.1* | 22.9* | 32.3* | 29.6˘ | — | — |

±values are unique peaks that can be used for ID and/or quantification.
*values indicate that the shift overlaps with other branching.
˘values indicate that the shift was not resolved/overlap with large 30 ppm peak.

Determination of C5 (Amyl) Branching

Figure 2:
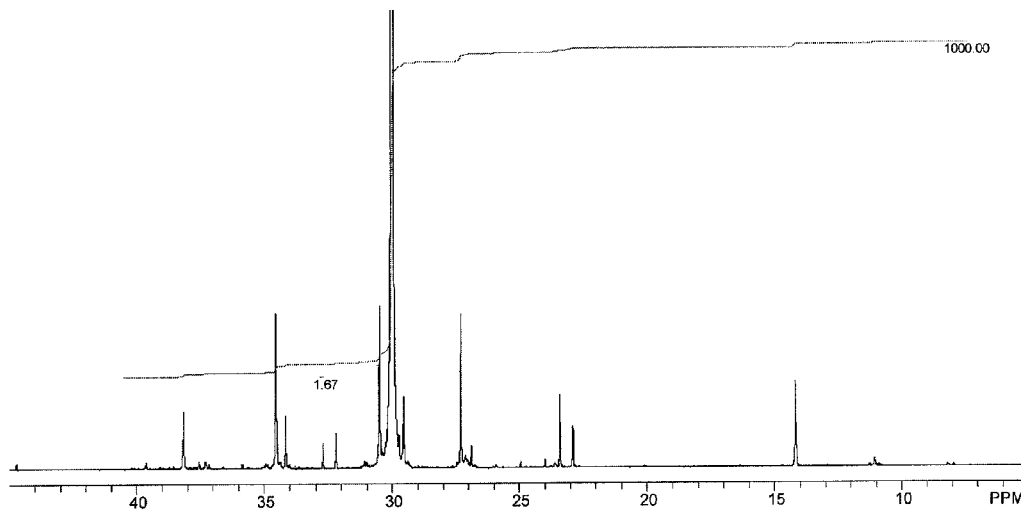
FIG. 2 is a $^{13}$C NMR spectrum of LDPE showing an example of quantification of C5 branches/1000 carbons.

C5 (amyl) branches are determined by the peak at 32.7 ppm. The number of C5 branches per 1000 total carbons is determined by setting the integral of the full LDPE spectrum, about 40 to 5 ppm, to a value of 1000, and integrating the 32.7 ppm peak. The 32.7 ppm peak integral is then a direct measure of the number of C5 branches per 1000 carbons. The example in FIG. 2 contains 1.67 C5 branches/1000 C.

Determination of C1 (Methyl) Branches

Figure 3:
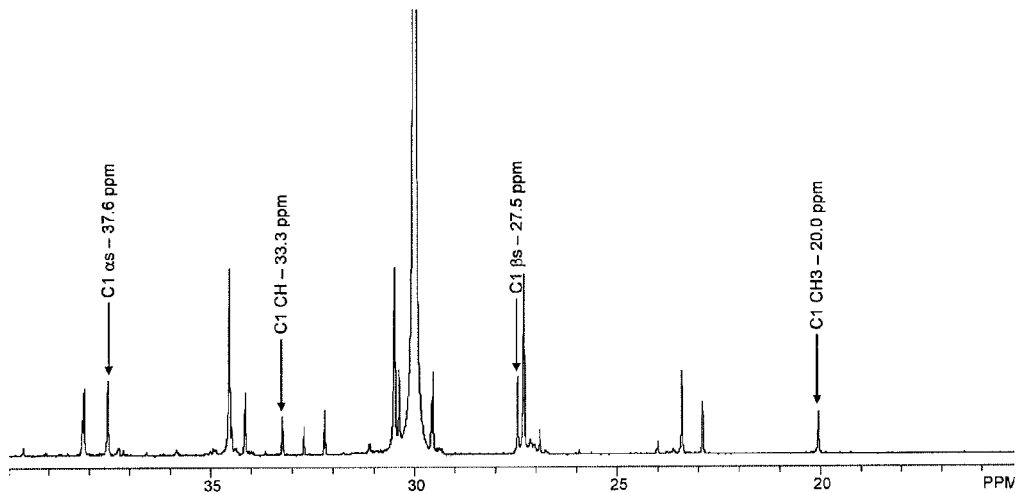
FIG. 3 is a $^{13}$C NMR spectrum of LDPE containing C1 branches.

C1 branches result in peaks at about 20, 33.3, 37.6, and 27.5 ppm. FIG. 3 shows a $^{13}$C NMR spectrum of sample 384561 which was produced using propylene as the chain transfer agent (CTA), and therefore exhibits a significant level of C1 (methyl) branches. This is because propylene acts both as a CTA and as a comonomer, and introduces C1 branches as would be observed in an ethylene-propylene LLDPE.

Determination of C3 (Propyl) Branches

Figure 4:
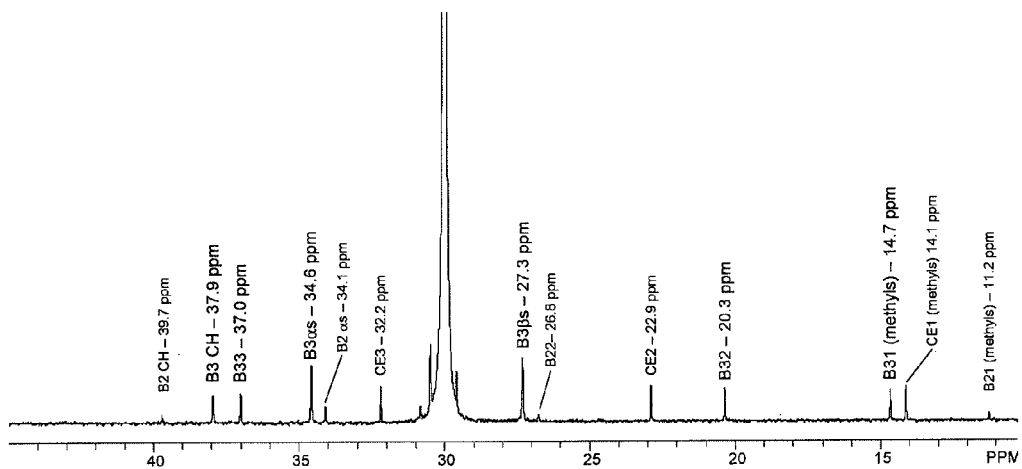
FIG. 4 is a $^{13}$C NMR spectrum of LDPE containing C3 branches.

C3 branches result in peaks at 37.9, 37.0, 20.3 and 14.7 ppm (and others that would be obscured in a LDPE spectrum). FIG. 4 shows a $^{13}$C NMR spectrum of a HDPE made with pentene comonomer, and therefore containing C3 branches. This particular sample also contains a very low level of C2 branching from butene.

Determination of C6+ Branches

C6 and longer branching (C6+) are determined algebraically in LDPE spectra. This is due to overlap in peaks from C4, C5, and C6+ branches. C4 and C5 can be determined independently, and their sum is subtracted from peaks containing contributions of two or more of these. C6+ branches are determined by a direct measure of C6+ branches in LDPE, where the long branches are not distinguished from "chain ends". The 32.2 ppm peak, representing the $3^{rd}$ carbon from the end of all chains or branches of 6 or more carbons, is used for C6+ determination.

Extraction of Poly(alkoxide)

To a 100 mL jar was added 2.0 gm of LDPE grafted poly (alkoxide) weighed to the nearest 0.0001 gm. To this solid was added 50+/−1 gm of HPLC grade tetrahydrofuran, and the mixture was shaken for 48 hours. The mixture was filtered through a #41 ashless filter paper into a tared 2 oz jar. The solvent was evaporated to dryness under a stream of nitrogen overnight. The undissolved solids were also dried overnight under a stream of nitrogen. The residue from the tetrahydrofuran solution was weighed as was the dried undissolved solids. The percentage of extracted material was determined by the following formula: ((residue mass/(residue mass+undissolved solids mass))*100.

Dynamic Mechanical Spectroscopy (DMS)

Resin is compression-molded into a 3 mm thick×1 inch circular plaque at 350° F. (177° C.) for 5 minutes under 1500 psi pressure in air. The sample is then taken out of the press and placed on the counter to cool.

Melt rheology, constant temperature frequency sweeps, are performed using a TA Instruments "Advanced Rheometric Expansion System (ARES)," equipped with 25 mm parallel plates, under a nitrogen purge. The sample is placed on the plate and allowed to melt for five minutes at 190° C. The plates are then closed to 2 mm, the sample trimmed, and then the test is started. The method has an additional five minute delay built in, to allow for temperature equilibrium. The experiments are performed at 190° C. over a frequency range of 0.1 to 100 rad/s. The strain amplitude is constant at 10%. The stress response is analyzed in terms of amplitude and phase, from which the storage modulus (G'), loss modulus (G"), dynamic viscosity η*, and tan (δ) are calculated.

Sample (Inventive Polymer) Preparation

Figure 5:
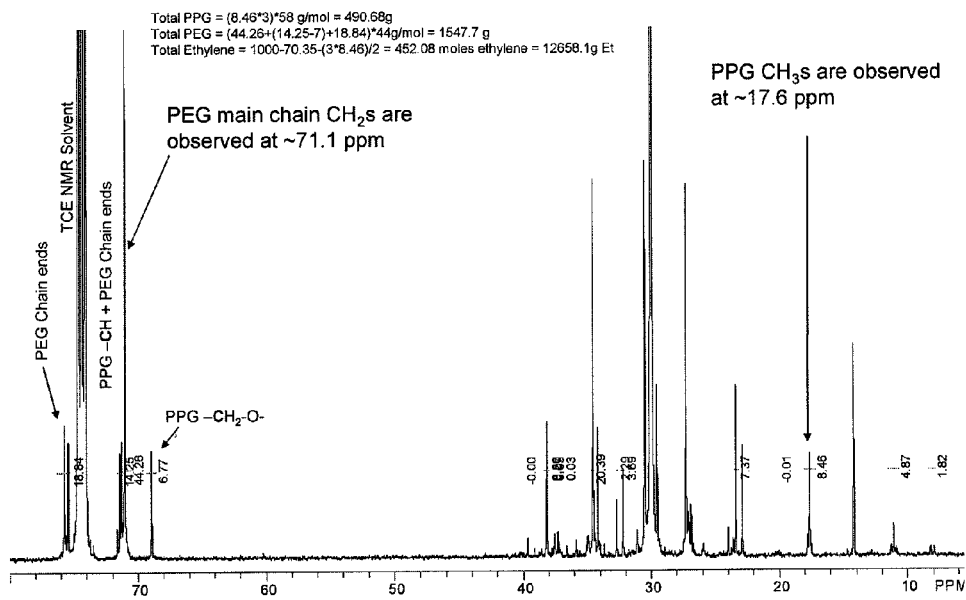
FIG. 5 is a $^{13}$C NMR spectrum of representative inventive polymer showing characteristic peaks of poly(alkoxide).

PEGPG (poly(ethylene glycol-ran-propylene glycol)) available from Aldrich, average Mn of 12,000, viscosity of 35,000 cSt at 25 C) is added to the reactor. After closing the 100 ml high-pressure stainless steel batch reactor, the agitator is turned on at 1000 rpm (revolutions per minute). The reactor is deoxygenated by pulling vacuum on the system and pressurizing with nitrogen. This is repeated three times. The reactor is then pressurized with ethylene up to 2000 bar while at ambient temperatures and then vented off. This is repeated three times. On the final ethylene vent of the reactor, the pressure is dropped only to a pressure of about 100 bars, where the reactor heating cycle is initiated. Upon achieving an internal temperature of about 225° C., the reactor is then pressurized with ethylene up to starting pressure. The ethylene/PEGPG mixture is stirred and held at 225° C. for at least 30 minutes. Ethylene is then used to sweep 1.32 ml of a mixture of 0.2395 mmol/ml propionaldehyde as chain transfer agent, 0.00599 mmol/ml di-tert-butyl peroxide and 0.00239 mmol/ml tert-butyl peroxy 2-ethylhexanoate as initiators in n-heptane into the reactor. An increase in pressure in conjunction with the addition of initiator causes the ethylene monomers to free-radical polymerize. The polymerization leads to a temperature increase. After allowing the reactor to continue to mix for 5 minutes and cooling down to 225° C. a second injection of 1.32 ml of a mixture of 0.00599 mmol/ml di-tert-butyl peroxide and 0.00239 mmol/ml tert-butyl peroxy 2-ethylhexanoate in n-heptane is swept with ethylene into the reactor. An increase in pressure in conjunction with the addition of initiator causes the ethylene monomers to free-radical polymerize. The second polymerization leads to a temperature increase. A third initiator injection is done at the same feed-conditions as the second one. The formed polymer is purged with ethylene out of the reactor at 1600 bars for 5 minutes. With this procedure 4 samples are made. The samples PEGPG-1 and -2 and the samples PEGPG-3 and -4 are combined to form two larger samples. The process conditions are given in Tables 3A-3D. The 13C NMR profile is shown in FIG. 5.

TABLE 3A

Polymerization Conditions for the First
and Second Initiator Injection of PEGPG

| Example | run no. — | m (PEGPG) g | $p_{start, 1}$ bar | $p_{max, 1}$ bar | $T_{start, 1}$ ° C. | $T_{max, 1}$ ° C. |
|---|---|---|---|---|---|---|
| 2 | PEGPG-1 | 2.34 | 1450 | 1750 | 225 | 275 |
| 2 | PEGPG-2 | 2.34 | 1450 | 1750 | 225 | 270 |
| 1 | PEGPG-3 | 3.11 | 1400 | 1700 | 225 | 270 |
| 1 | PEGPG-4 | 3.11 | 1400 | 1700 | 225 | 270 |

TABLE 3B

Polymerization Conditions for the First and Second Initiator
Injection of PEGPG

| Example | run no. — | $p_{start, 2}$ bar | $p_{max, 2}$ bar | $T_{start, 2}$ ° C. | $T_{max, 2}$ ° C. |
|---|---|---|---|---|---|
| 2 | PEGPG-1 | 1500 | 1780 | 225 | 270 |
| 2 | PEGPG-2 | 1500 | 1780 | 225 | 265 |
| 1 | PEGPG-3 | 1480 | 1750 | 225 | 270 |
| 1 | PEGPG-4 | 1480 | 1750 | 225 | 260 |

TABLE 3C

Polymerization Conditions for the
Third Initiator Injection of PEGPG

| Example | run no. — | $p_{start, 3}$ bar | $p_{max, 3}$ bar | $T_{start, 3}$ ° C. | $T_{max, 3}$ ° C. | $p_{end}$ bar |
|---|---|---|---|---|---|---|
| 2 | PEGPG-1 | 1500 | 1780 | 225 | 270 | 1500 |
| 2 | PEGPG-2 | 1500 | 1780 | 225 | 260 | 1500 |

TABLE 3C-continued

Polymerization Conditions for the
Third Initiator Injection of PEGPG

| Example | run no. — | $p_{start, 3}$ bar | $p_{max, 3}$ bar | $T_{start, 3}$ ° C. | $T_{max, 3}$ ° C. | $p_{end}$ bar |
|---|---|---|---|---|---|---|
| 1 | PEGPG-3 | 1480 | 1750 | 225 | 265 | 1500 |
| 1 | PEGPG-4 | 1500 | 1780 | 225 | 260 | 1500 |

TABLE 3D

Polymerization Conditions for the Third Initiator Injection of PEGPG

| Example | run no. — | m(PEGPG-graft-PE) g | ethylene-conversion | %-PEGPG in end-product |
|---|---|---|---|---|
| 2 | PEGPG-1 | 17.14 | 12.2 | 13.7 |
| 2 | PEGPG-2 | 15.24 | 10.3 | 15.4 |
| 1 | PEGPG-3 | 16.39 | 9.8 | 19.0 |
| 1 | PEGPG-4 | 14.94 | 8.4 | 20.8 |

TABLE 4

Poly(alkoxide) Grafting Results

| Sample | Sample ID | Total wt % PEGPG (NMR) | wt % Free PEGPG (Extractable)$^f$ | wt/wt ratio PEGPG/LDPE |
|---|---|---|---|---|
| 1 | 201001120-47A | 13.9 ± 0.5 | 7.3 | 0.16 |

Melt Index, Melt Index Ratio $I_{10}/I_2$, and Density

Table 5A shows the measured melt index ($I_2$), melt index ratio ($I_{10}/I_2$), and density of the examples as compared to commercial LDPE of comparable melt index. The Examples show much higher melt index ratios ($I_{10}/I_2$) (19.1 and 22.0) even at their relatively high melt indexes ($I_2$) of 13.7 and 15.2 as compared to the Comparative Examples ($I_{10}/I_2$=9.7-9.9 and $I_2$=11.7-24.7. The densities of the Examples are high (0.9349-0.9353 g/cc), which is higher density than is typically achievable on for commercial LDPE. The densities of the commercial LDPE Comparative Examples are much lower at 0.9181-0.9226 g/cc.

TABLE 5A

Properties of PE-graft-PDMS Polymers and Three
Comparative LDPE Polymers

| Example | MI ($I_2$) (g/10 min) | $I_{10}/I_2$ | Density (g/cc) |
|---|---|---|---|
| 1 | 13.7 | 22.0 | 0.9349 |
| 2 | 15.2 | 19.1 | 0.9353 |
| C-1 | 11.7 | 9.7 | 0.9181 |
| C-2 | 24.7 | 9.9 | 0.9226 |

Figure 6:
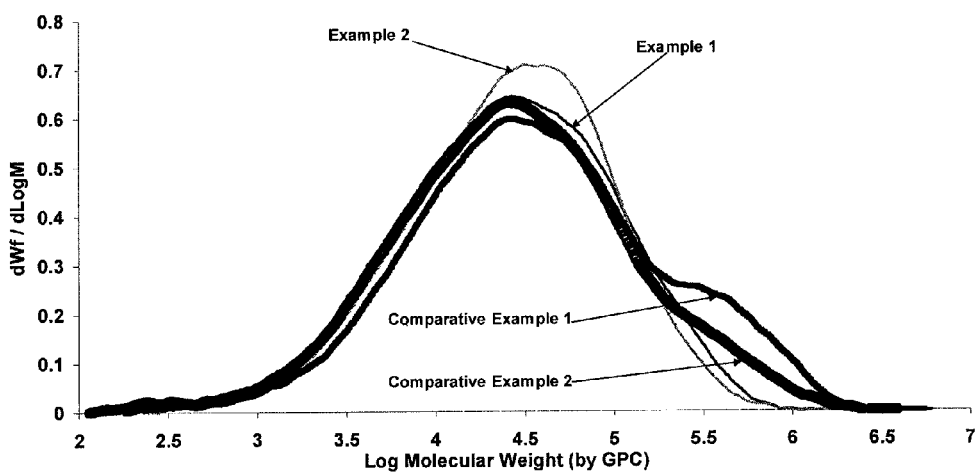
FIG. 6 is a graph reporting molecular weight distribution of the examples and selective comparative examples.

Table 5B reports the melt index (for reference) and the molecular weight properties of the Examples and Comparative Examples and FIG. 6 shows a plot of the molecular weight distribution. For a given melt index (MI), the Examples show a lower weight average molecular weight $M_w$, lower molecular weight distribution $M_w/M_n$, and lower long chain branching levels as indicated by $LCB_f$ and gpcBR as compared to the Comparative Examples. FIG. 6 visually shows this narrow molecular weight distribution.

TABLE 5B

Properties of PE-graft- PEGPG Polymers
and Comparative LDPE Polymers

| Example | MI (I$_2$) (g/10 min) | M$_w$ (g/mol) | M$_n$ (g/mol) | M$_w$/M$_n$ | M$_z$ (g/mol) | LCB$_f$ | gpcBR |
|---|---|---|---|---|---|---|---|
| 1 | 13.7 | 56,870 | 9,530 | 5.97 | 180,000 | 1.38 | 0.927 |
| 2 | 15.2 | 52,340 | 10,210 | 5.13 | 153,200 | 1.51 | 0.859 |
| C-1 | 11.7 | 118,660 | 10,940 | 10.85 | 540,900 | 3.38 | 2.93 |
| C-2 | 24.7 | 80,550 | 7,510 | 10.73 | 418,700 | 2.35 | 1.79 |

Table 5C reports the melt index and density (for reference) and the DSC properties of the Examples and Comparative Examples. As compared to the Comparative Examples which are of lower density, the Examples have a similar melting point, lower crystallinity or heat of fusion, and a similar to lower crystallization point. The relationship between melting point and density and heat of fusion and density for the Examples, Comparative Examples, and Commercial LDPEs are given in FIGS. 7 and 8, respectively. At a given density, the samples of this invention have a lower melting point and a lower heat of fusion than the Commercial LDPEs and Comparative Examples.

TABLE 5C

Properties of PE-graft-PEGPG Polymers
and Comparative LDPE Polymers

| Example | MI (I$_2$) (g/10 min) | Density (g/cc) | T$_m$ (° C.) | Heat of Fusion (J/g) | % Cryst. | T$_c$ (° C.) |
|---|---|---|---|---|---|---|
| 1 | 13.7 | 0.9349 | 107.2 | 129.8 | 44.5 | 94.4 |
| 2 | 15.2 | 0.9353 | 107.5 | 127.6 | 43.7 | 96.3 |
| C-1 | 11.7 | 0.9181 | 106.0 | 137.6 | 47.1 | 94.4 |
| C-2 | 24.7 | 0.9226 | 109.8 | 147.1 | 50.4 | 99.2 |

Figure 7:
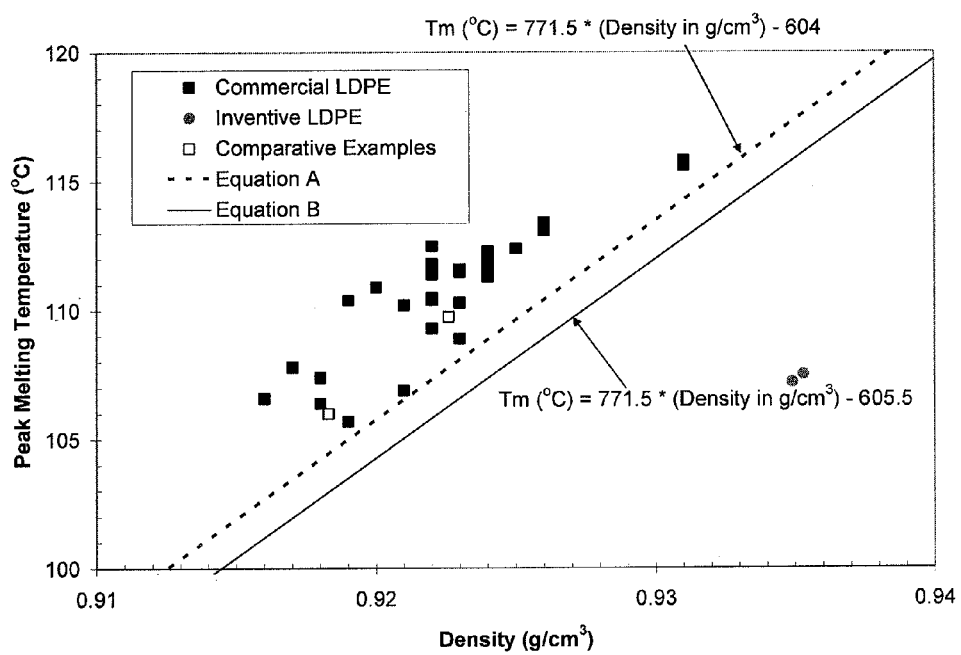
FIG. 7 is a plot reporting the relationship of peak melting temperature (Tm) and density of commercially available LDPE and two inventive polymers.
Figure 8:
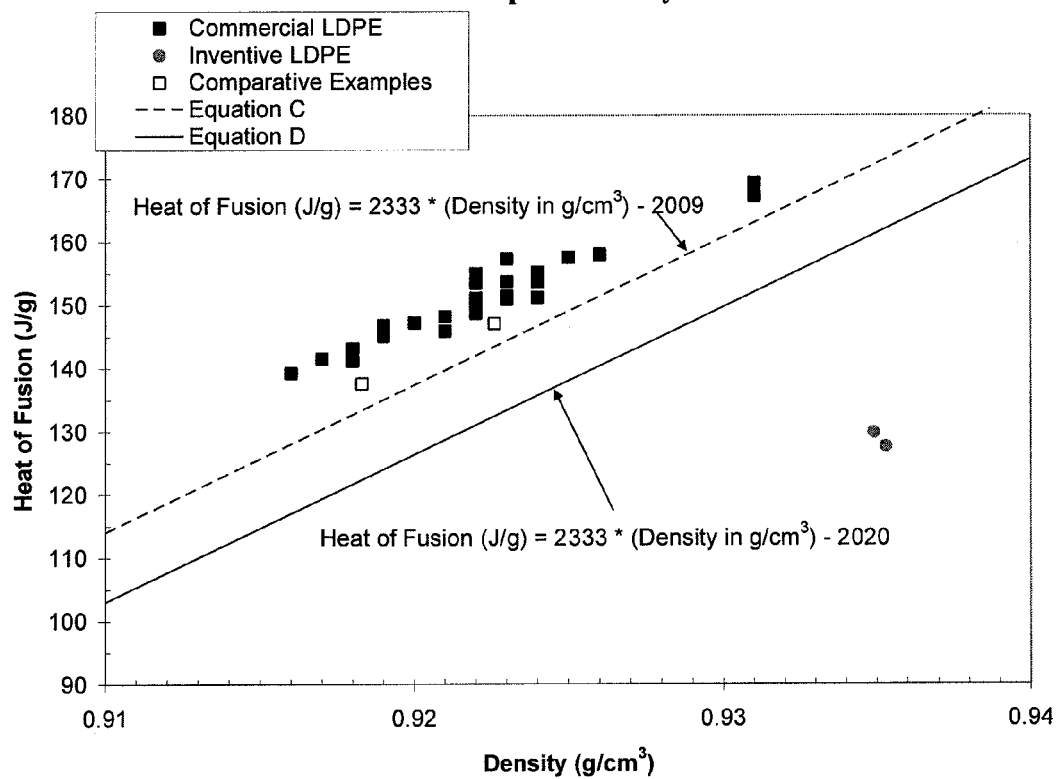
FIG. 8 is a graph reporting the relationship of heat of fusion and density of the two examples, commercially available LDPE and comparative polymers.

Melting temperature vs. density is shown in FIG. 7. Heat of fusion vs. density is shown in FIG. 8.

Short Chain Branching

All values are in branches per 1000 total carbons except as noted in Table 6. Branching values for grafted samples are calculated based on total observed carbons, including those of the grafted polymer (PDMS) and based on the LDPE carbons only. No C3 (propyl) branches are observed in any of the samples.

TABLE 6

Short Chain Branching of Sample and Comparative Samples

| Sample | Sample ID | C1 | C5 (amyl) | |
|---|---|---|---|---|
| 1 | 201001120-42A (PEG/PPG) | 0 | 2.07 | +/− 0.21 |
| C-1 | 326231 | 0 | 2.41 | +/− 0.24 |
| C-2 | 384561 | 3.45 | 1.71 | +/− 0.17 |
| C-3 | 272553 | 0 | 1.67 | +/− 0.17 |

Figure 9:
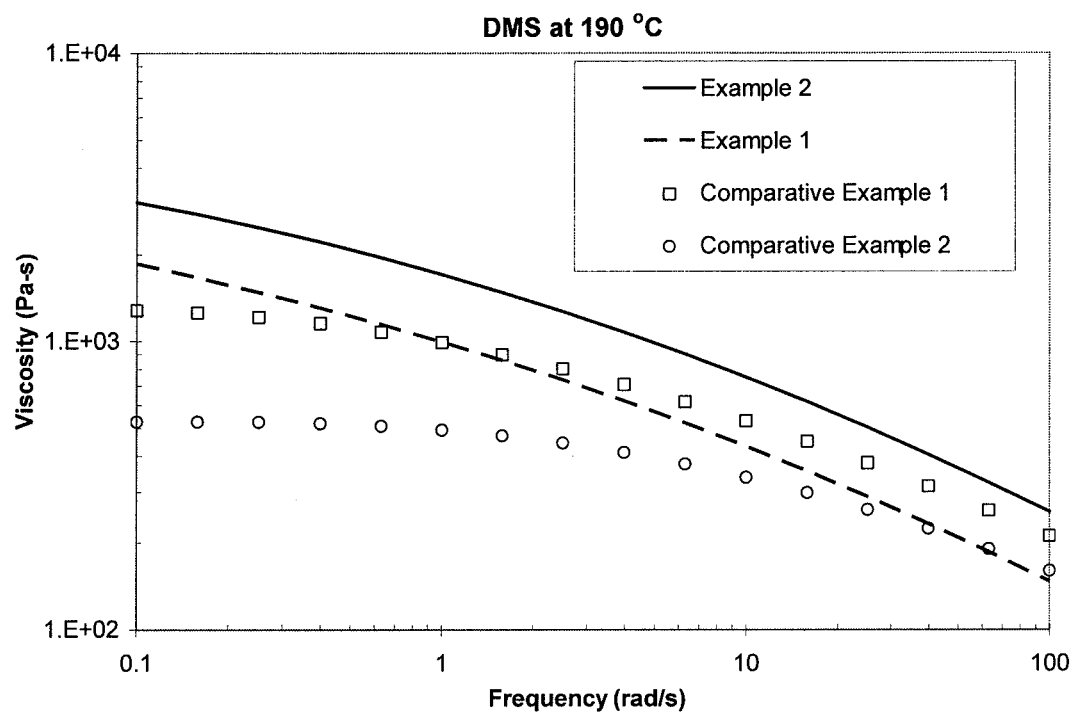
FIG. 9 is a DMS overlay of the two examples and comparative examples.

Table 7 shows the frequency and viscosity data as measured by dynamic mechanical spectroscopy of the Inventive Examples and Comparative Examples and FIG. 9 shows this data plotted. As can be seen, the Examples have a higher viscosity ratio (11.8-12.6) in comparison to the Comparative Examples (3.29-6.06) indicating the good shear sensitivity (decrease in viscosity with increasing shear rate) and processability. FIG. 9 shows that the Examples have higher low shear viscosities and lower high shear viscosities as compared to the Comparative Examples of similar melt index.

TABLE 7

DMS Melt Rheology Data of PE-graft-PEGPG Polymers and
Comparative Examples

| Frequency (rad/s) | Viscosity in Pa-s Example 1 | Viscosity in Pa-s Example 2 | Viscosity in Pa-s Comparative Example 1 | Viscosity in Pa-s Comparative Example 2 |
|---|---|---|---|---|
| 0.100 | 1,861 | 3,035 | 1,280 | 526 |
| 0.158 | 1,666 | 2,762 | 1,258 | 526 |
| 0.251 | 1,479 | 2,483 | 1,214 | 525 |
| 0.398 | 1,306 | 2,214 | 1,154 | 520 |
| 0.631 | 1,145 | 1,954 | 1,078 | 509 |
| 1.000 | 996 | 1,707 | 992 | 493 |
| 1.585 | 860 | 1,478 | 899 | 471 |
| 2.512 | 735 | 1,268 | 803 | 444 |
| 3.981 | 622 | 1,076 | 708 | 411 |
| 6.310 | 521 | 903 | 616 | 376 |
| 10.000 | 432 | 751 | 530 | 338 |
| 15.849 | 355 | 617 | 450 | 299 |
| 25.119 | 289 | 503 | 378 | 261 |
| 39.811 | 233 | 405 | 315 | 224 |
| 63.096 | 186 | 324 | 259 | 191 |
| 100.000 | 147 | 257 | 211 | 160 |
| Viscosity at 0.1 rad/s (Pa-s) | 1,861 | 3,035 | 1,280 | 526 |
| Viscosity at 100 rad/s (Pa-s) | 147 | 257 | 211 | 160 |
| Viscosity Ratio (V 0.1/V 100) | 12.6 | 11.8 | 6.06 | 3.29 |

The inventive polymers exhibit higher viscosity ratios than the comparative polymers and this is indicative of better processibility. The data is graphically illustrated in FIG. 9.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

We claim:

1. A polymer comprising units derived from ethylene and poly(alkoxide), wherein a portion of the ethylene is bonded to one or more backbone carbon atoms of the poly(alkoxide), the polymer having at least 0.15 units of amyl, groups per 1000 carbon atoms and no appreciable propyl branches as determined by $^{13}$C Nuclear Magnetic Resonance (NMR).

2. The polymer of claim 1 wherein the polymer comprises at least one ethylene-based polymeric branch bonded to a backbone carbon atom of the poly(alkoxide).

3. The polymer of claim 1 in which the polymer comprises no appreciable methyl branches as determined by $^{13}$C NMR.

4. The polymer of claim 1 having a density of at least 0.92 g/cm$^3$.

5. The polymer of claim 1 in which less than 60 weight percent of the poly(alkoxide) is extractable by solvent extraction.

6. The polymer of claim 1 having a peak melting temperature Tm in ° C. and density in g/cm$^3$ that satisfies the mathematical relationship:

$$Tm < 771.5 \, (° C. \cdot cc/g) \times (density) - 604 \, (° C.).$$

7. The polymer of claim 1 having a heat of fusion (H$_f$) in Joules/grams (J/g) and density in g/cm$^3$ that satisfies the mathematical relationship:

$$H_f < 2333 \, (J \cdot cc/g^2) \times (density) - 2009 \, (J/g).$$

8. A composition comprising the polymer of claim 1.

9. An article comprising at least one component formed from the composition of claim 8.

10. The article of claim 9 in the form of a film.

\* \* \* \* \*